United States Patent [19]

Wheldon et al.

[11] 4,282,259
[45] Aug. 4, 1981

[54] PROCESS FOR PREPARING AN EXTRACT OF HOPS

[75] Inventors: Alfred G. Wheldon; Peter E. Cockerill, both of Dagenham Dock, England

[73] Assignee: The Distillers Company (Carbon Dioxide) Limited, Reigate, England

[21] Appl. No.: 128,061

[22] Filed: Mar. 7, 1980

Related U.S. Application Data

[63] Continuation of Ser. No. 898,246, Apr. 20, 1978, abandoned.

[30] Foreign Application Priority Data

Apr. 29, 1977 [GB] United Kingdom ............... 18056/77

[51] Int. Cl.³ .......................... A23L 1/20; A23L 1/28
[52] U.S. Cl. ..................................... 426/231; 62/513; 99/278; 159/24 A; 159/DIG. 32; 203/26; 426/424; 426/425; 426/489; 426/520; 426/524; 426/600; 426/655
[58] Field of Search .............. 426/592, 600, 655, 425, 426/424, 481, 489, 520, 524, 231; 99/278; 260/705; 159/24 A, 24 B, DIG. 32; 203/26; 62/238 D, 324 B, 513

[56] References Cited

U.S. PATENT DOCUMENTS

| | | | |
|---|---|---|---|
| 1,969,187 | 8/1934 | Schutt | 62/238 D |
| 2,895,546 | 7/1959 | Sadtler | 159/24 |
| 3,477,856 | 11/1969 | Schultz | 426/424 |
| 4,104,409 | 8/1978 | Vitzthum et al. | 426/600 X |

FOREIGN PATENT DOCUMENTS

1346134 2/1974 United Kingdom .
1388581 3/1975 United Kingdom .

OTHER PUBLICATIONS

McCabe et al., *Unit Operations of Chemical Engineering,* 1956, pp. 570–571.

*Primary Examiner*—Arthur L. Corbin
*Attorney, Agent, or Firm*—Sughrue, Rothwell, Mion, Zinn and Macpeak

[57] ABSTRACT

A method of preparing an extract from hops comprises contacting the hops to be extracted with carbon dioxide in the liquid state to dissolve the matter to be extracted in the liquid carbon dioxide, heating the solution of extract to evaporate carbon dioxide from the solution of extract, compressing and condensing the evaporated carbon dioxide vapor to re-form liquid carbon dioxide, and re-cycling the liquid carbon dioxide to contact the material to be extracted. At least part of the heat evolved from the carbon dioxide vapor after its compression and during its change of state from vapor to liquid carbon dioxide is used to cause the change of state of the liquid carbon dioxide in the solution of the extract to evaporate the carbon dioxide from the solution of the extract.

A plant for the preparation of an extract of hops by extraction with liquid carbon dioxide is also disclosed together with modifications of the plant to enhance the recovery of hop oils or to obtain a separate extraction of the hop oils.

9 Claims, 4 Drawing Figures

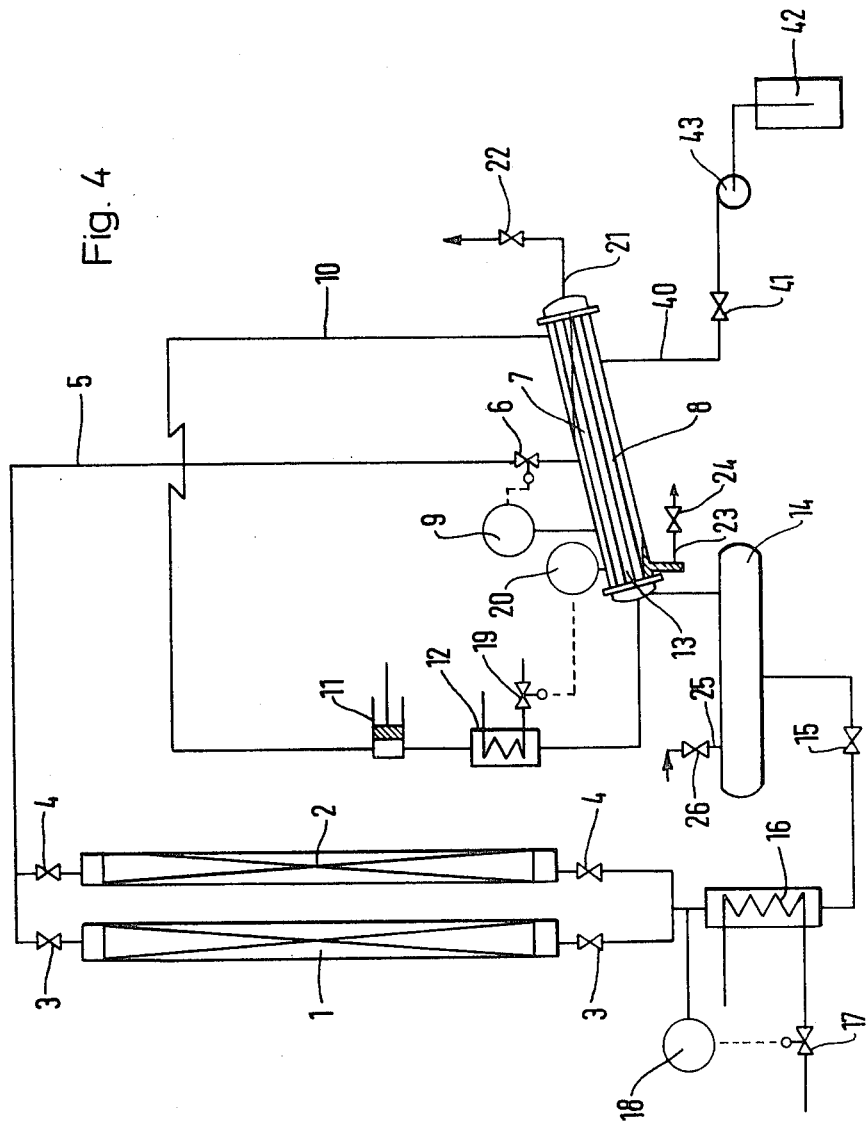

PROCESS FOR PREPARING AN EXTRACT OF HOPS

This is a Continuation of application Ser. No. 898,246, filed Apr. 20, 1978, now abandoned.

BACKGROUND OF THE INVENTION

This invention relates to a method of preparing, and a plant for the preparation of, an extract from a material by extracting the matter from the material using liquid carbon dioxide as the extracting agent and it has particular application to the extraction of the bittering principles from hops.

U.S. Pat. No. 3,477,856 discloses a general process for the extraction of flavours and flavour containing materials from a wide variety of different organic substances using liquid carbon dioxide as the extracting agent. The material to be extracted and the liquid carbon dioxide are passed through an extraction column in which the matter to be extracted is dissolved in the liquid carbon dioxide and the solution of the extracted matter in the liquid carbon dioxide is then passed to an evaporator in which the carbon dioxide is evaporated. The matter extracted remains in the evaporator and the carbon dioxide vapour is condensed in a further, independent, condenser and then re-cycled into contact with the matter to be extracted.

A considerable amount of work has been carried out to produce extracts of coffee and tea using carbon dioxide as the extracting agent but, in general, this has always involved the use of carbon dioxide as a super critical fluid. In particular, super critical carbon dioxide is used to prepare a de-caffeinated coffee. British Pat. No. 1,346,134 is a typical example of one of the various extraction processes. In this Specification, carbon dioxide which is super critical with respect to both pressure and temperature passes through an extraction column packed with ground coffee beans to extract the coffee oil containing the aroma constituents of the coffee. After all of the coffee oil has been extracted, water is introduced into the system and the completely water saturated super critical carbon dioxide is then used to extract the caffeine from the ground coffee in the extraction column. Finally, the coffee oils are returned to the ground, de-caffeinated coffee. Throughout this entire process, the carbon dioxide is always super critical with respect to either temperature or pressure and, during extraction, the carbon dioxide is super critical with respect to both of these. This Specification also discusses the use of liquid carbon dioxide and includes a comparative example showing that, for coffee, approximately eighty times more carbon dioxide is required to be passed through the coffee when the carbon dioxide is in the liquid state than when it is in the super critical state to obtain the required extraction of the coffee oil.

Another British Pat. No. 1,388,581, discusses the use of super critical carbon dioxide as the extracting agent for hops. This Specification mentions that it is possible to obtain an extract from hops using liquid carbon dioxide but again discusses that the dissolving power of liquid carbon dioxide is much lower than that of super critical carbon dioxide. The Specification describes a system in which carbon dioxide gas is compressed until it is super critical with respect to pressure, subsequently heated so that it is super critical with respect to both pressure and temperature, and then passes through an extraction column packed with hops. The super critical carbon dioxide is then cooled so that it is only super critical with respect to pressure and introduced into a separator in which the lower solubility of the matter extracted from the hops in the carbon dioxide, which is only super critical with respect to pressure, causes the extracted matter to fall out of solution. The carbon dioxide is then re-cycled through the compressor and extraction chamber. The Specification describes the extract as being a paste varying in colour from light to dark green. The conventional solvent extractions strip out not only the bittering principles but the chlorophyll and presumably the super critical carbon dioxide extracts some of the chlorophyll from the hops. It is very difficult to remove the chlorophyll and other matter from the extract, for example to obtain an isomerised extract, without also losing some of the flavour components.

All of the extraction plants using super critical carbon dioxide work at very high pressures and so result in the plant being very expensive.

SUMMARY OF THE INVENTION

We have found that, under carefully controlled conditions of temperature and pressure, liquid carbon dioxide is very selective in its action and it is possible to obtain a golden yellow hop extract which contains the bittering principles of the hops, i.e. the alpha acid fraction of the soft resins contained in the hops together with other required flavour components. The remainder of the extract is composed of inert material that does not influence either the taste or the colour of the extract. This extract is so pure that it can be isomerised directly without requiring any further purification steps. This invention provides a method and plant which enables such an extraction to be carried out very efficiently using liquid carbon dioxide as the extracting agent.

According to a first aspect of this invention, a method of preparing an extract from a material comprises contacting the material to be extracted with carbon dioxide in the liquid state to dissolve the matter to be extracted in liquid carbon dioxide, heating the solution of extract to evaporate carbon dioxide from the solution of extract, compressing and condensing the evaporated carbon dioxide vapour to re-form liquid carbon dioxide and re-cycling the liquid carbon dioxide to contact the material to be extracted, at least part of the heat evolved from the carbon dioxide vapour after its compression and during its change of state from vapour to liquid carbon dioxide being used to cause the change of state of the liquid carbon dioxide in the solution of the extract to evaporate the carbon dioxide from the solution of the extract.

Preferably, the liquid carbon dioxide is subjected to a cooling step before it is contacted with the material to be extracted.

According to a second aspect of this invention, a plant for the preparation of an extract of hops by extraction with liquid carbon dioxide comprises an extraction chamber having an inlet and an outlet and being arranged to contain the hops to be extracted, a compressor for compressing carbon dioxide gas, a cooler, and a heat exchanger having a primary path for the warmer medium to be cooled and a secondary path for the cooler medium to be warmed, the inlet of the secondary path of the heat exchanger being connected to the outlet of the extraction chamber so that a stream of hop extract dissolved in liquid carbon dioxide emerging from the outlet of the extraction chamber is introduced into the secondary path of the heat exchanger where it receives heat and where carbon dioxide is evaporated, the outlet of the secondary path of the heat exchanger being connected to the compressor so that the carbon dioxide vapour leaving the outlet of the secondary path of the heat exchanger is applied to the compressor where it is compressed, the inlet of the primary path of the heat exchanger being connected to the compressor so that the compressed carbon dioxide vapour warmed by its compression is introduced into the primary path of the heat exchanger where it loses heat to the secondary path and where the carbon dioxide vapour changes state and liquifies to form liquid carbon dioxide, the outlet of the primary path of the heat exchanger being connected to the cooler so that liquid carbon dioxide emerging from the outlet of the primary path of the heat exchanger is further cooled in the cooler and the cooler is connected to the inlet of the extraction chamber so that liquid carbon dioxide is re-cycled to the inlet of the extraction chamber, the secondary path of the heat exchanger including at least one additional outlet for the matter extracted from the hops.

This plant leads to a very efficient extraction being carried out since the plant is in thermal equilibrium, with the sensible heat and latent heat of the compressed carbon dioxide vapour as it is liquified being used to provide the heat required to evaporate carbon dioxide from the solution of the hop extract in the other path of the heat exchanger. The cooling of the liquid carbon dioxide in the cooler before it is introduced into the extraction column reduces the temperature of the liquid carbon dioxide to below its equilibrium temperature corresponding to the operating pressure at that point. This takes the liquid carbon dioxide leaving the heat exchanger off the boil before feeding it to the extraction column so that substantially no carbon dioxide vapour is present in the extraction column which ensures the maximum contact between the liquid carbon dioxide and the hops in the extraction column.

Preferably, the plant includes means to control the flow of coolant through the cooler in dependence upon the temperature of liquid carbon dioxide introduced into the inlet of the extraction chamber to maintain the temperature of the liquid carbon dioxide introduced into the extraction chamber at a constant predetermined temperature. Preferably, the means is arranged to maintain the temperature within a range from 0° to 15° C. It is further preferred that the means is arranged to maintain a temperature of substantially 8° C. This temperature corresponds to the maximum solubility of the alpha acids contained in the hops together with the reasonably low solubility of the beta acids contained in the hops and when the extraction is carried out at this temperature, a particularly beneficial extract is obtained.

Depending upon the ambient temperatures surrounding the plant and the efficiency of its thermal insulation, the plant may be arranged so that the cooler just balances the net input of heat from the compressor but it is preferred that the extraction plant includes a further heat exchanger located between the compressor and the inlet to the primary path of the heat exchanger. Depending upon the ambient temperatures, the degree of thermal insulation, and the exact temperature at which it is required to carry out the extraction and evaporation of the carbon dioxide, this further heat exchanger may add or subtract heat from the compressed carbon dioxide leaving the compressor. This further heat exchanger merely exerts a fine balance on the system.

Preferably, the plant includes means for controlling the flow of heat exchange fluid through the further heat exchanger in dependence upon the pressure subsisting at a point in the plant. In this case, the means preferably senses the pressure subsisting in the secondary path of the heat exchanger and controls the further heat exchanger to maintain the pressure in the secondary path of the heat exchanger at a value such that the temperature in the secondary path of the heat exchanger is within a range from 10° C. to the critical temperature of carbon dioxide. It is preferred that the means maintains the temperature of the secondary path of the heat exchanger within the range from 10° C. to the critical temperature of carbon dioxide, 31° C. since below temperatures of 10° C. solid carbon dioxide hydrate $CO_2.8H_2O$ is deposited on the heat exchange surfaces of the heat exchanger and this interferes with the efficiency of the heat exchanger.

As carbon dioxide evaporates in the secondary path of the heat exchanger and consequently the concentration of the matter extracted from the hops increases, the concentration gradually exceeds its solubility in liquid carbon dioxide and so the extract is precipitated from solution. The hop extract has the form of a yellow mobile liquid and forms a separate layer in the lower parts of the secondary path of the heat exchanger.

Preferably, the primary path of the heat exchanger also includes a vent outlet at its uppermost end. This vent outlet enables any volatile impurities present in the system to be vented. This is particularly important in the case of oxygen since it is difficult to ensure that all the air is purged from the hops by flushing with carbon dioxide gas and, in the case of inefficient flushing of the system with carbon dioxide, air entrained in the hops leads to the presence of air in the system during extraction. Nitrogen is inert and has no real effect on the system but oxygen attacks the extracted material and causes oxidation. The provision of the vent in the primary path from the heat exchanger together with the change of state which takes place in the primary path of the heat exchanger enables the volatile impurities to be vented from the system resulting in substantially no oxidation of the matter extracted from the hops. This is a considerable advantage over the systems using super critical carbon dioxide to extract matter since, with a system in which carbon dioxide is always super critical in respect to pressure, temperature or both, it is impossible to vent any volatile impurities which are present in the system.

At present in the brewing industry, a process of "dry hopping" is carried out in which hops are steeped in the fermented wort to increase the concentration of hop oils in the wort and improve the taste and bouquet of the completed beer. We have found that the hop oils can be isolated separately from the bittering principles of the hops and that the proportion of the hop oils contained in the extracted matter can also be varied. The concentration of hop oils in the liquid carbon dioxide in the secondary path of the heat exchanger gradually builds up and, whilst some hop oils are mixed with the alpha and beta acid fraction of the soft resins, a far greater quantity remain in solution with the liquid carbon dioxide.

To recover a different product from the secondary path of the heat exchanger a further outlet may be provided in communication with the solution of extract in liquid carbon dioxide in the secondary path of the heat exchanger and the plant may also include an evaporator arranged to receive the solution of the extract and to evaporate carbon dioxide to leave a product which is rich in hop oils. The carbon dioxide evaporated from the evaporator is returned to the compressor and again re-cycled through the system. This alternative product has a high proportion of hop oils, of the order of 50%, as well as some alpha and beta acids. Such a hop extract would give far more flavour and bouquet to a beer and the two different products may be blended to give the required proportions of bittering agents and flavour components.

The plant may also include a distillation column in series with the outlet of the secondary path of the heat exchanger and the inlet to the compressor. With a distillation column in this position, a pure extract of hop oils can be obtained. The hop oils may be separated from any carbon dioxide or it may remain as a solution in liquid carbon dioxide so that they can be injected into the brewed beer during its carbonation at the completion of the brewing process in a somewhat analogous fashion to the existing "dry hopping" process.

Finally, the plant may also include means to introduce a further component into the secondary path of the heat exchanger. This further component which is usually an organic solvent and preferably ethanol, can be injected into the secondary path of the heat exchanger and act as an anti-freeze to prevent the formation of the solid carbon dioxide hydrate $CO_2.8H_2O$ and to allow the secondary path of the heat exchanger to operate at substantially lower temperatures, or alternatively this additional component may be used to change the equilibrium occurring in the secondary path of the heat exchanger. In this way, an additional component, particularly when it is ethanol, can produce a homogeneous extract having a high proportion of hop oils in combination with the alpha and beta acids and the matter extracted from the hops may have the form of a tincture of the extract in ethanol. The addition of this further component into the system in the secondary path of the heat exchanger can be used to cause separation of the various phases in the secondary path of the heat exchanger and to modify the volatility of the various components to enhance or depress the concentration of hop oils leaving the outlet of the secondary path of the heat exchanger.

Preferably, the plant includes at least two extraction chambers arranged in parallel and arranged so that an extraction can be carried out using one of the extraction chambers whilst the other extraction chamber is being cleaned and repacked with hops.

BRIEF DESCRIPTION OF THE DRAWINGS

An example of a process and plant in accordance with this invention and three modifications of the plant for use in the extraction of the bittering principles and hop oils from hops will now be described with reference to the accompanying drawings; in which:

FIG. 4 is a diagram of a plant showing a third modification.

DETAILED DESCRIPTION OF THE PREFERRED EMBODIMENTS

Figure 1:
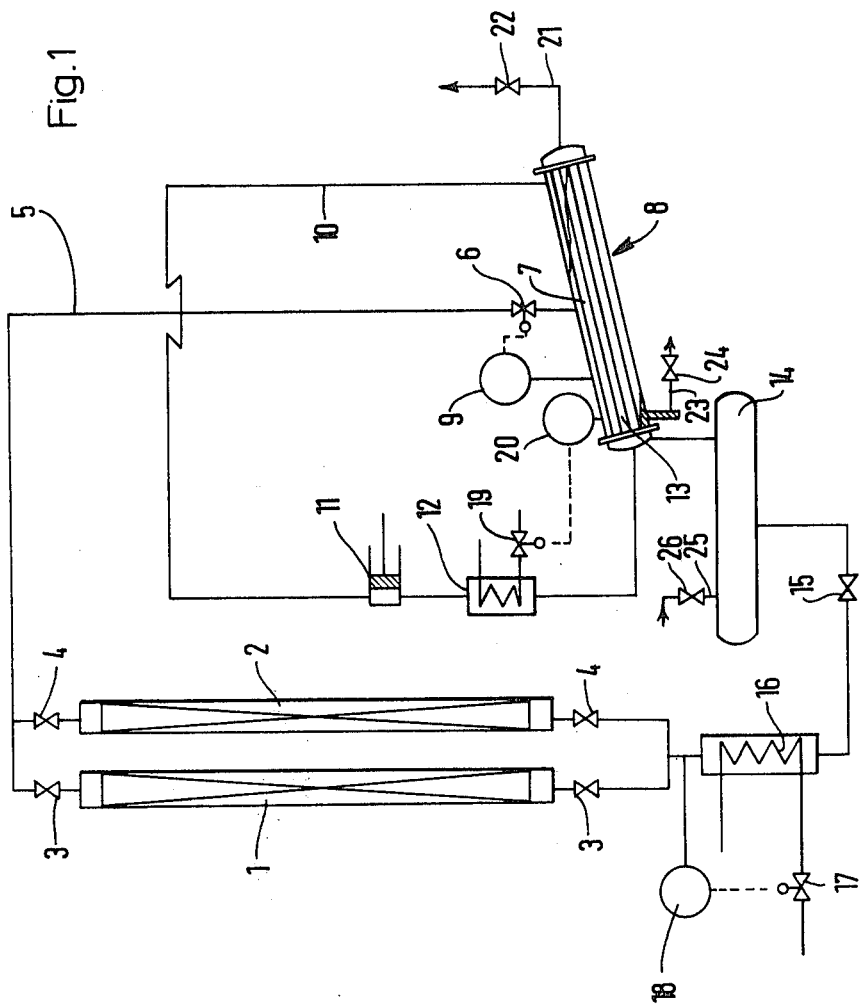
FIG. 1 is a diagram of the basic arrangement of the plant.

The basic plant comprises two similar extraction chambers 1 and 2 arranged in parallel, with a pair of isolating valves 3 and 4 at opposite ends of each chamber 1 and 2 respectively. Each chamber is formed as a column and includes a filter plate covering its inlet and outlet to prevent the hops from leaving the chambers but to allow liquid carbon dioxide to percolate up through the hops in each chamber. The outlets at the tops of the chambers 1 and 2 are connected through a pipe 5 to a flow control valve 6. The outlet of the flow control valve 6 leads into a secondary path 7 of a heat exchanger 8. The flow control valve 6 is controlled by a liquid level sensor 9 so that a substantially constant level is maintained in the secondary path 7 of the heat exchanger 8.

A pipe 10 leads from an outlet of the secondary path 7 of the heat exchanger 8 to the inlet of a compressor 11. The outlet of the compressor 11 is connected to a heat exchanger 12 which, in this example, is a cooler, and the outlet of the cooler is connected to a primary path 13 of the heat exchanger 8. An outlet of the primary path 13 of the heat exchanger 8 is connected to a liquid receiver vessel 14 and an outlet from the liquid receiver vessel 14 is connected through an isolating valve 15 to an inlet of a sub-cooler 16. The outlet of the sub-cooler 16 leads directly into the inlet of the extraction chambers 1 and 2 through the valves 3 and 4. The quantity of coolant passing through the sub-cooler 16 is controlled by a flow control valve 17 under the control of a temperature sensor 18 which detects the temperature of the liquid carbon dioxide leaving the sub-cooler 16 and varies the flow of coolant through the sub-cooler 16 to maintain a constant temperature at the output of the sub-cooler 16. The flow of coolant through the heat exchanger 12 is controlled by a flow control valve 19 under the control of a pressure sensor 20. The heat exchanger 12 serves to trim the overall heat balance in the system and, as the pressure within the system increases, the flow control valve 19 is opened to increase the degree of cooling that occurs in the heat exchanger 12.

The secondary path 7 of the heat exchanger 8 includes a further vent outlet 21 controlled by a flow control valve 22 and a product outlet 23 controlled by a flow control valve 24. A vent outlet enables volatile material to be vented from the secondary path 7 of the heat exchanger 8 and the product outlet 23 allows the extracted matter to be removed from the secondary path of the heat exchanger 8. The liquid receiver 14 includes a further inlet 25 under the control of a flow control valve 26 through which carbon dioxide is introduced into the system to fill the system initially and to make up any losses.

The entire plant is made from stainless steel and the plant is arranged to operate at pressures of the order of 750 p.s.i.g. Since the heat exchanger 8 has carbon dioxide in both its primary and secondary paths the differential pressure between the primary and secondary path of the heat exchanger 8 is merely that generated by the compressor 11 and this differential pressure is quite low, of the order of 100 p.s.i.g. This small differential pressure between the primary and secondary paths of the heat exchanger simplifies its construction.

With the valves 3 closed to isolate the extraction chamber 1, the chamber 1 is packed with milled hops.

Most of the air is purged from the chamber 1 using gaseous carbon dioxide and then the valves 3 are opened to pressurize the chamber 1 and allow liquid carbon dioxide to percolate up through the hops in the chamber 1. As the liquid carbon dioxide percolates through the extraction chamber 1 it extracts the parts of the hops which are soluble in liquid carbon dioxide. Principally, the matter extracted from the hops are the hop oils and the alpha and beta acid fraction of the soft resins contained in the hops, the alpha acids forming the bittering principles of the hops, and the hop oils forming the main flavour and aroma components of the hops. The solution of the extracted matter passes along the pipe 5 and, through the control valve 6 into the secondary path 7 of the heat exchanger 8. In the heat exchanger 8 the solution is warmed causing a change of state of the carbon dioxide to occur and the carbon dioxide vapour boiled off from the solution then leaves the secondary path 7 of the heat exchanger 8 through the pipe 10 to the compressor 11. The carbon dioxide vapour is compressed in the compressor 11 and, during compression, the vapour is heated on account of the work done in compressing the gas. The compressed gas passes through the heat exchanger 12 and then to the primary path 13 of the heat exchanger 8. In this primary path, the compressed gas changes its state and forms liquid carbon dioxide. The heat removed from the compressed gas as it is initially cooled to the condensation temperature and then the latent heat evolved as the carbon dioxide changes its state from the vapour to the liquid phase is transferred to the solution of extract in the secondary path 7 of the heat exchanger 8. This leads to boiling of the solution to change the state of the liquid carbon dioxide in the secondary path 7 of the heat exchanger 8 to evolve further carbon dioxide vapour from the solution in the secondary path 7. The liquid carbon dioxide formed in the primary path 13 of the heat exchanger 8 passes into the liquid receiver 14 where any carbon dioxide vapour entrained with the liquid carbon dioxide is separated. The liquid carbon dioxide from the liquid receiver 14 then passes through a flow control valve 15 to the sub-cooler 16 where it is cooled to a temperature below its equilibrium temperature at the pressure subsisting in the sub-cooler 16. It has been found that if the liquid carbon dioxide is cooled to a temperature of 8° C. a particularly beneficial extraction occurs in the chambers 1 and 2. Therefore, the temperature sensor 18 controls the flow of coolant through the sub-cooler 16 via the flow control valve 17 to ensure that the liquid carbon dioxide leaves the sub-cooler 16 at a temperature of 8° C. This liquid carbon dioxide at the temperature of 8° C. is then re-cycled through the extraction chamber 1 and thence through the remainder of the system.

Once all the matter has been extracted from the hops in the extraction chamber 1, the flow control valves 6 and 15 are closed and the liquid carbon dioxide remaining in the extraction chamber 1 is used to purge air from the extraction chamber 2 and also to partly pressurize the extraction chamber 2. Valves 3 are then closed to isolate the spent hops in the extraction chamber 1 and the flow control valves 6 and 15 are once again opened to allow extraction to continue only this time through the hops contained in the extraction chamber 2. Whilst the hops in the extraction chamber 2 are being extracted the spent hops in extraction chamber 1 are removed from the chamber 1 and the chamber is re-packed with fresh hops.

The heat exchanger 12 is used to trim the thermal equilibrium of the entire system. In general, the heat required for vaporising the liquid carbon dioxide from the solution of extract in the secondary path 7 of the heat exchanger 8 is more or less balanced by the heat evolved on the change of state of the gaseous carbon dioxide in the primary path 13 into liquid carbon dioxide; with the sub-cooler 16 just about balancing the heat added to the system by the work done on the gas in the compressor 11. However, depending on the ambient temperature surrounding the plant and the efficiency of its thermal insulation the flow of coolant through the heat exchanger 12 is used to absorb the excess heat in the system. The flow of coolant through the heat exchanger 12 is controlled via the flow control valve 19 from a pressure controller which senses the pressure subsisting in the secondary path 7 of the heat exchanger 8. It has been found that if the pressure subsisting in the secondary path 7 of the heat exchanger 8 is controlled so that a temperature of just above 10° C. occurs in the secondary path of the heat exchanger 7 the plant operates in a very satisfactory manner since carbon dioxide hydrate $CO_2.8H_2O$ is not formed on the heat exchange surfaces of the secondary path of the heat exchanger 8 to impede the transfer of heat between the primary and secondary paths of the heat exchanger 8.

As the carbon dioxide is evaporated from the secondary path 7 of the heat exchanger 8, the concentration of the matter extracted from the hops, particularly the concentration of the alpha and beta acids, builds up in the secondary path of the heat exchanger and the concentration of the alpha and beta acids exceeds their solubility in liquid carbon dioxide. After this saturation point has been reached the alpha and beta acids are precipitated from solution and form a separate mobile layer in the lowermost end of the secondary path 7 of the heat exchanger 8. This separate phase containing the alpha and beta acids, and some of the hop oils, is drawn off the secondary path 7 of the heat exchanger 8 by opening the flow control valve 24 to allow the product to leave the secondary path 7 of the heat exchanger 8 out of the outlet 23.

Any air remaining with the hops in the extraction chambers 1 or 2 after the initial flushing operation with carbon dioxide tends to build-up in the secondary path 7 of the heat exchanger 8. This build-up of air, particularly the oxygen contained in the air, leads to oxidative changes in the matter extracted from the hops which impairs the quality of the extract. Accordingly, volatile impurities in the secondary path of the heat exchanger are vented through the outlet 21 under the control of the flow control valve 22. This enables all of the air and other gaseous impurities present in the system to be vented and removed from the system and ensures that a top quality extract is obtained.

Figure 2:
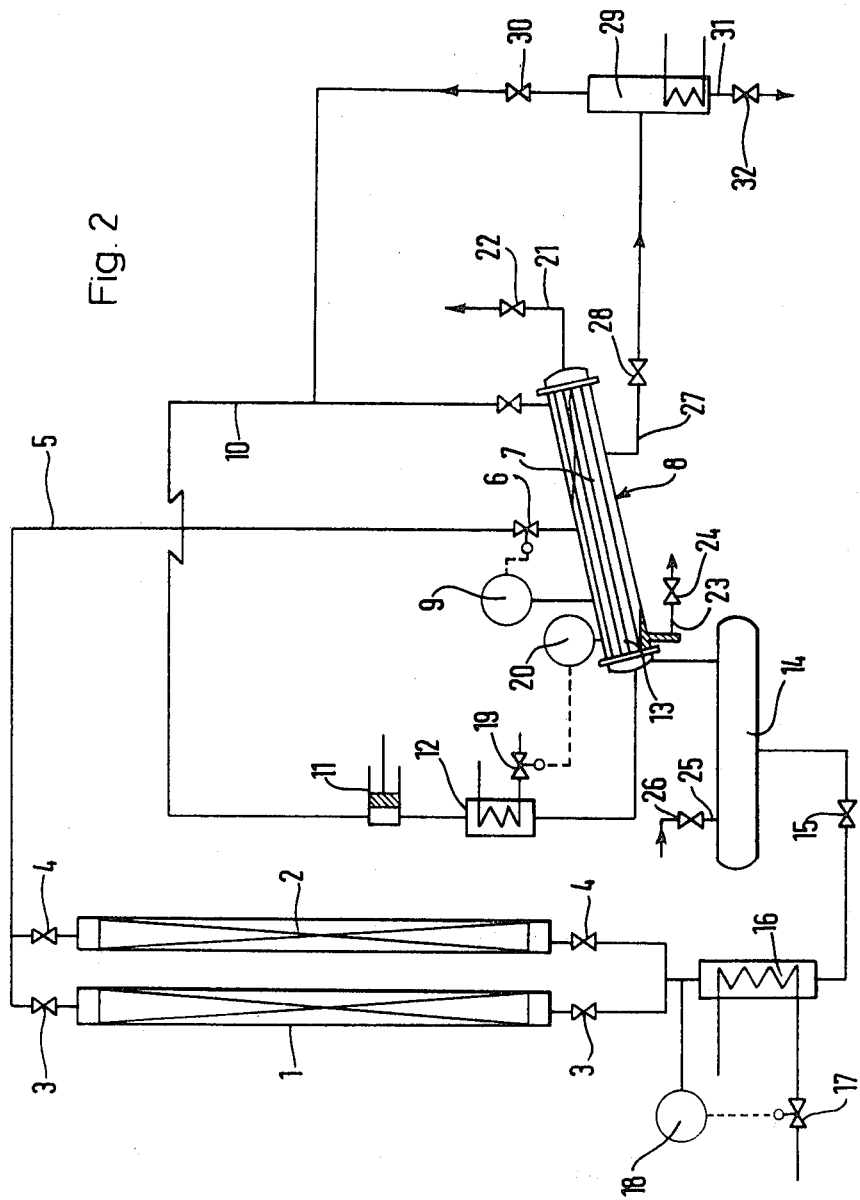
FIG. 2 is a diagram of a plant showing a first modification.

As the carbon dioxide vapour is evaporated from the secondary path 7 of the heat exchanger 8 the concentration of hop oils in the liquid carbon dioxide in the secondary path 7 increases. These hop oils are a valuable part of the matter extracted from the hops since they contain a large proportion of the flavour and aroma principles of the hops. A first modification of the plant shown in FIG. 2 enables an alternative extract to be obtained which includes a higher percentage of hop oils. This plant is identical to the basic plant except that the secondary path 7 of the heat exchanger 8 includes a further outlet 27 controlled by a flow control valve 28 and this further outlet leads to an evaporator 29. The top of the evaporator is connected through a flow control valve 30 to the pipe and the base of the evaporator includes an outlet 31 controlled by a flow control valve 32. The operation of this modified plant is basically similar and a hop extract containing mainly the alpha and beta acids is withdrawn from the outlet 23 through the flow control valve 24. However, in addition, the liquid carbon dioxide containing the solution of the extract is also removed from the secondary path 7 of the heat exchanger 8 through the outlet 27 under the control of the flow control valve 28. This solution is then evaporated in the evaporator 29 and the carbon dioxide boiled off is returned to the pipe 10 and thence the compressor 11 and re-cycled through the plant. The residue remaining in the evaporator 29 is drawn off the base through the outlet 31 and this residue contains some alpha and beta acids but is rich in hop oils, for example it contains up to 50% of hop oils. The two different extracts may be mixed to enhance the proportion of hop oils or this further extract which is high in hop oils may be used alone.

Figure 3:
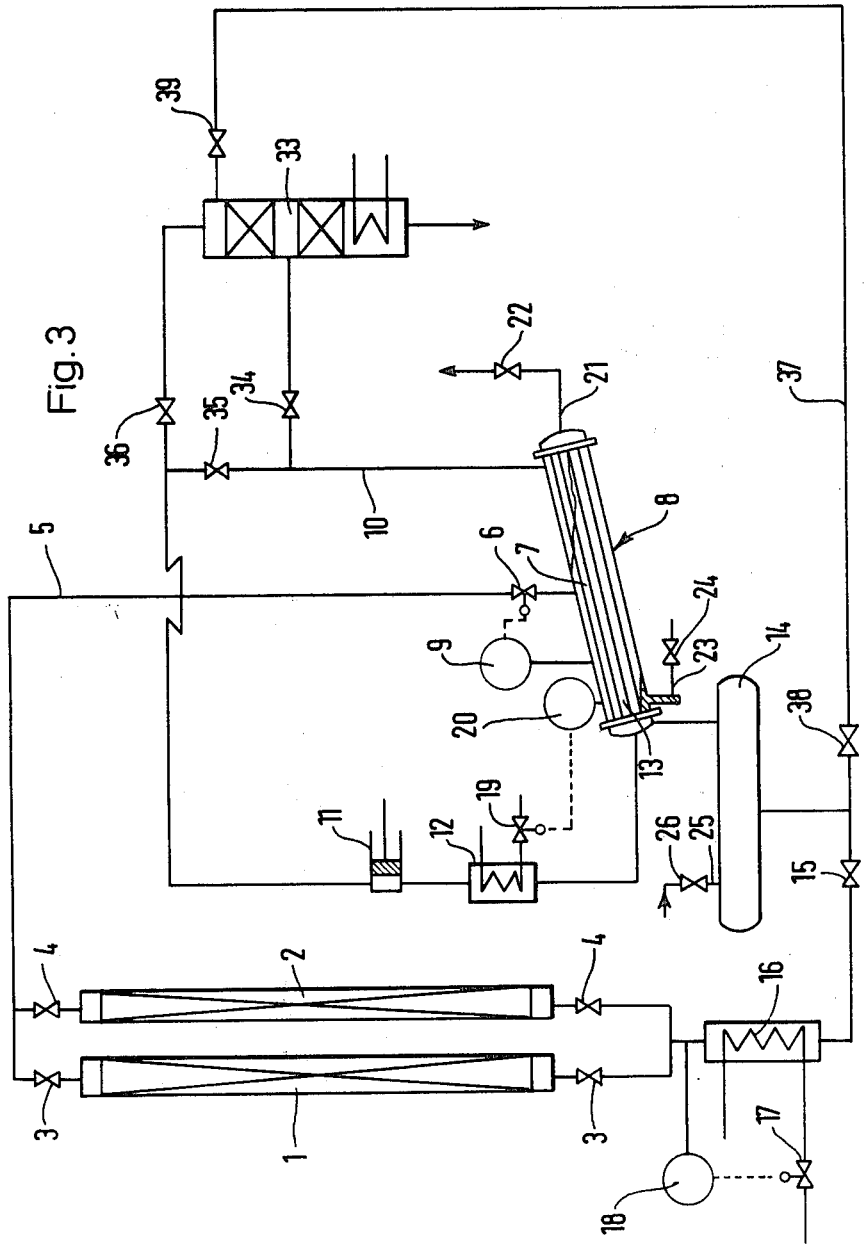
FIG. 3 is a diagram of a plant showing a second modification.

A second modification of the basic plant is shown in FIG. 3 and this modification enables the hop oils tp be isolated so that the product of this plant will be a hop extract containing principally the alpha and beta acids together with approximately 10% of hop oils, and a pure hop oil extract or, a concentrated solution of hop oils in liquid carbon dioxide. In this second modification, a distillation tower 33 is connected in parallel with the pipe 10 and valves 34, 35 and 36 are arranged so that the distillation tower 33 can be connected in series with the outlet from the secondary path of the heat exchanger 8 and the compressor 11. A further pipe 37 and flow control valves 38 and 39 supply the distillation tower 33 with liquid carbon dioxide. As the concentration of hop oils in the carbon dioxide in the secondary path 7 of the heat exchanger 8 builds up, a point is reached where hop oils will be carried off with the evaporated carbon dioxide. To recover the hop oils, the valve 35 is closed and the valves 34 and 36 opened and this mixed vapour containing carbon dioxide and the hop oils is passed through the distillation tower 33. Liquid carbon dioxide from the liquid receiver 14 is supplied to the top of the distillation tower 33 and scrubs the vapour to remove the hop oils from the vapour phase. Carbon dioxide is then boiled off from the base of the distillation tower 33 to leave a product which consists exclusively of hop oils or a concentrated solution of hop oils in liquid carbon dioxide. The hop oils can be injected into already brewed beer to improve the flavour and bouquet of the beer and, when the beer is to be subjected to a final carbonation step it is preferred for the hop oils to be injected into the brewed beer in solution with liquid carbon dioxide. The quantity of hop oils carried over into the vapour phase of the carbon dioxide leaving the secondary path of the heat exchanger 8 can be increased by operating the plant with the secondary path of the heat exchanger 8 close to the critical temperature of carbon dioxide which is about 31° C. The reason for this is that the carry-over of the hop oils depends upon the relative solubility of the hop oils in the liquid and vapour phases of the carbon dioxide and the solubility of the hop oils in the carbon dioxide vapour at a temperature just above the critical temperature is substantially the same as the solubility of the hop oils in the carbon dioxide liquid at just below the critical temperature.

In a final modification of the basic plant shown in FIG. 4, a solvent is injected into the secondary path 7 of the heat exchanger 8. Once again the plant is generally similar to the basic plant except that the secondary path 7 of the heat exchanger 8 includes a further inlet 40 controlled by a flow control valve 41 and a container 42 containing the solvent is connected to the valve 41 through a pump 43. The preferred solvent is ethanol and the injection of ethanol into the secondary path of the heat exchanger firstly acts as an anti-freeze and so prevents the solid carbon dioxide hydrate $CO_2.8H_2O$ from being formed and being deposited on the walls of the secondary path of the heat exchanger and this enables the temperature in the secondary path of the heat exchanger to be less than 10° C. Further, if a greater quantity of ethanol is injected into the secondary path of the heat exchanger, the ethanol will homogenise the two separate phases in the secondary path of the heat exchanger to form a single phase and then this single phase can be drawn off and the carbon dioxide evaporated from the single phase. After the carbon dioxide has been evaporated an extract will remain which will have the form of a tincture of hop extract in ethanol. The ratio of the bittering principles to the hop oils of this resulting extract contained in this tincture will be the same as the ratio of the bittering principles to the hop oils contained in the hops. This modification shown in FIG. 4 may also be included together with the modifications shown in FIG. 2 or FIG. 3 and then the addition of an additional component into the system present in the secondary path of the heat exchanger 8 may be used to influence the volatility of the system in the secondary path 7 of the heat exchanger 8 and, in this way, enhance or depress the carry over of the particular components from the liquid to the vapour phase.

We claim:

1. A method of preparing an extract of hops by extraction with liquid, non-supercritical carbon dioxide, comprising the steps of:
   (a) contacting a supply of hops with carbon dioxide in the liquid, non-supercritical state and at a first temperature to dissolve matter, to be extracted, in said liquid, non-supercritical carbon dioxide;
   (b) supplying heat to the resulting solution of extract matter in liquid carbon dioxide to evaporate non-supercritical carbon dioxide vapour from said solution and concentrate said extract matter in said solution to form a concentrated solution of extract matter in liquid carbon dioxide, said concentrated solution of extract matter in liquid carbon dioxide being at a second temperature which is at or above said first temperature and below the critical temperature of carbon dioxide;
   (c) compressing said evaporated carbon dioxide vapour to increase its liquefaction temperature to a third temperature which is above said second temperature and below the critical temperature of carbon dioxide, whereby said carbon dioxide vapour is maintained in its non-supercritical state;
   (d) bringing said heated and compressed carbon dioxide vapour into indirect thermal heat exchanging contact with said resulting solution to condense said compressed carbon dioxide vapour and reform liquid, non-supercritical carbon dioxide therefrom, and to simultaneously transfer heat released during such condensation to said resulting solution, said heat released during said condensation providing said heat supplied to said resulting solution of extract matter in liquid carbon dioxide to evaporate non-supercritical carbon dioxide vapour from said resulting solution;

(e) sub-cooling said condensed, reformed, liquid, non-supercritical carbon dioxide to reduce its temperature to said first temperature;

(f) re-cycling said reformed, liquid, non-supercritical carbon dioxide at said first temperature to contact said supply of hops;

(g) continuing said re-cycling of said reformed, liquid, non-supercritical carbon dioxide until said concentration of said concentrated solution of extract builds up to such an extent that two separate liquid phases are formed with one phase contacting extract matter that has fallen out of solution and the other phase being said solution of extract matter in liquid, non-supercritical carbon dioxide;

(h) separating said one phase containing extract matter that has fallen out of solution from said other phase containing said solution of said extract matter in said non-supercritical carbon dioxide; and (i) recovering said one phase.

2. The method of preparing an extract in accordance with claim 1, further comprising cooling said compressed non-supercritical carbon dioxide vapour after step (c) and before step (d) to balance the thermal equilibrium of the process, the degree of said cooling being controlled in dependence upon the pressure subsisting during step (b) to maintain said pressure constant during step (b) and thereby maintain said second temperature constant.

3. The method of preparing an extract in accordance with claim 2, further comprising controlling the flow rate of said solution of extract matter in said liquid carbon dioxide between steps (a) and (b) in dependence upon the level of said solution of extract matter in said liquid carbon dioxide in step (b), said pressure subsisting during step (b) being selected such that said second temperature is above 10° C. to prevent the formation of solid carbon dioxide hydrate.

4. The method of preparing an extract in accordance with claim 1, wherein said first temperature of said carbon dioxide in said liquid, non-supercritical state is substantially 8° C., whereby evaporation of said carbon dioxide vapour, while said liquid carbon dioxide is contacting said supply of hops, is prevented.

5. A method of preparing an extract of hops by extraction with liquid, non-supercritical carbon dioxide, comprising the steps of:

(a) contacting a supply of hops with carbon dioxide in the liquid, non-supercritical state at a first temperature of about 8° C. and at a pressure such that said liquid, non-supercritical carbon dioxide is below its boiling point to dissolve matter, to be extracted, in said liquid, non-supercritical carbon dioxide;

(b) supplying heat to the resulting solution of extract matter in liquid carbon dioxide evaporate non-supercritical carbon dioxide vapour from said solution and concentrate said extract matter in said solution to form a concentrated solution of extract matter in liquid carbon dioxide, said concentrated solution of extract matter in liquid carbon dioxide being at a second temperature which is at or above 10° C. and below the critical temperature of carbon dioxide whereby formation of solid carbon dioxide hydrate is prevented;

(c) compressing said evaporated carbon dioxide vapour to increase its liquefaction temperature to a third temperature which is above said second temperature and below the critical temperature of carbon dioxide, whereby said carbon dioxide vapour is maintained in its non-supercritical state;

(d) cooling said compressed carbon dioxide vapour to balance the thermal equilibrium of the process, the degree of said cooling being controlled in dependence upon the pressure subsisting during step (b) to maintain said pressure constant during step (b) and thereby maintain said second temperature constant;

(e) bringing said compressed and cooled carbon dioxide vapour into indirect thermal heat exchanging contact with said resulting solution to condense said compressed carbon dioxide vapour and reform liquid, non-supercritical carbon dioxide therefrom, and to simultaneously transfer heat released during such condensation to said resulting solution, said heat released during said condensation providing said heat supplied to said resulting solution of extract matter in liquid carbon dioxide to evaporate non-supercritical carbon dioxide vapour from said solution;

(f) sub-cooling said condensed, reformed, liquid, non-supercritical carbon dioxide to reduce its temperature to said first temperature;

(g) re-cycling said reformed, liquid, non-supercritical carbon dioxide at said first temperature to contact said supply of hops;

(h) continuing said re-cycling of said reformed, liquid, non-supercritical carbon dioxide until said concentration of said concentrated solution of extract builds up to such an extent that two separate liquid phases are formed with one phase containing extract matter that has fallen out of solution and the other phase being said solution of extract matter in liquid, non-supercritical carbon dioxide;

(i) separating said one phase containing extract matter that has fallen out of solution from said other phase containing said solution of said extract matter in said non-supercritical carbon dioxide; and (j) recovering said one phase.

6. A method of preparing an extract of hops by extraction with liquid, non-supercritical carbon dioxide, comprising the steps of:

(a) contacting a supply of hops with carbon dioxide in the liquid, non-supercritical state and at a first temperature to dissolve matter, to be extracted, in said liquid, non-supercritical carbon dioxide;

(b) supplying heat to the resulting solution of extract matter in liquid carbon dioxide to evaporate non-supercritical carbon dioxide vapour from said solution and concentrate said extract matter in said solution to form a concentrated solution of extract matter in liquid carbon dioxide, said concentrated solution of extract matter in liquid carbon dioxide being at a second temperature which is at or above said first temperature and below the critical temperature of carbon dioxide;

(c) compressing said evaporated carbon dioxide vapour to increase its liquefaction temperature to a third temperature which is above said second temperature and below the critical temperature of carbon dioxide, whereby said carbon dioxide vapour is maintained in its non-supercritical state;

(d) bringing said heated and compressed carbon dioxide vapour into indirect thermal heat exchanging contact with said resulting solution to condense said compressed carbon dioxide vapour and re-form liquid, non-supercritical carbon dioxide therefrom, and to simultaneously transfer heat released during such condensation to said resulting solution, said heat released during said condensation providing said heat supplied to said resulting solution of extract matter in liquid carbon dioxide to evaporate non-supercritical carbon dioxide vapour from said solution;

(e) sub-cooling said condensed, reformed, liquid, non-supercritical carbon dioxide to reduce its temperature to said first temperature;

(f) re-cycling said reformed, liquid, non-supercritical carbon dioxide at said first temperature to contact said supply of hops;

(g) continuing said re-cycling of said reformed, liquid, non-supercritical carbon dioxide until said concentration of said concentrated solution of extract builds up to such an extent that two separate liquid phases are formed with one phase containing extract matter that has fallen out of solution and the other phase being said solution of extract matter in liquid, non-supercritical carbon dioxide;

(h) removing a side stream from said other phase from above said one phase;

(i) heating said side-stream of said other phase to evaporate carbon dioxide vapour from said side-stream to leave a concentrated solution of extract matter;

(j) mixing said carbon dioxide vapour evolved during step (i) with said evaporated carbon dioxide vapour evolved in step (b), whereby said vapour evolved from both steps (i) and (b) is compressed in step (c);

(k) separating said one phase containing extract matter that has fallen out of solution from said concentrated solution of said extract matter and recovering said one phase; and (1) recovering said concentrated solution of extract matter, said concentrated solution of extract matter resulting from step (i) containing a more soluble fraction of said extract matter than said one phase resulting from step (k), said concentrated solution of extract matter resulting from step (i) thereby containing a higher proportion of oils and volatiles.

7. The method of preparing an extract in accordance with claim 6, further comprising cooling said compressed non-supercritical carbon dioxide vapour after step (c) and before step (d) to balance the thermal equilibrium of the process, the degree of said cooling being controlled in dependence upon the pressure subsisting during step (b) to maintain said pressure constant during step (b) and thereby maintain said second temperature constant.

8. The method of preparing an extract in accordance with claim 7, further comprising controlling the flow rate of said solution of extract matter in said liquid carbon dioxide between steps (a) and (b) in dependence upon the level of said solution of extract matter in said liquid carbon dioxide in step (b), said pressure subsisting during step (b) being selected such that said second temperature is above 10° C. to prevent the formation of solid carbon dioxide hydrate.

9. The method of preparing an extract in accordance with claims 6 or 8, wherein said first temperature of said carbon dioxide in said liquid, non-supercritical state is substantially 8° C. whereby evaporation of said carbon dioxide vapour, while said liquid carbon dioxide is contacting said supply of hops, is prevented.

* * * * *